United States Patent
Viswanathan et al.

(10) Patent No.: US 11,956,639 B2
(45) Date of Patent: Apr. 9, 2024

(54) INTERNET OF THINGS DEVICE PROVISIONING

(71) Applicant: International Business Machines Corporation, Armonk, NY (US)

(72) Inventors: Hari Hara Prasad Viswanathan, Thanjavur (IN); Amit Mohan Mangalvedkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/079,854

(22) Filed: Oct. 26, 2020

(65) Prior Publication Data
US 2022/0132303 A1  Apr. 28, 2022

(51) Int. Cl.
*H04W 12/71* (2021.01)
*H04L 9/40* (2022.01)

(52) U.S. Cl.
CPC ......... *H04W 12/71* (2021.01); *H04L 63/0876* (2013.01); *H04L 63/1416* (2013.01)

(58) Field of Classification Search
CPC ............... H04L 41/0809; H04L 63/062; H04L 63/0876; H04L 63/1416; H04L 67/12; H04L 63/1425; H04W 12/71
See application file for complete search history.

(56) References Cited

U.S. PATENT DOCUMENTS

| | | |
|---|---|---|
| 6,499,017 B1 | 12/2002 | Feibelman |
| 9,461,976 B1 | 10/2016 | Smith |
| 9,800,468 B2 | 10/2017 | Smith |
| 9,866,637 B2 | 1/2018 | Doraiswamy |
| 9,936,388 B2 | 4/2018 | Stan et al. |
| 11,245,577 B2* | 2/2022 | Behm ................. H04L 41/085 |
| 2015/0222621 A1 | 8/2015 | Baum |
| 2016/0173450 A1 | 6/2016 | Mircescu et al. |
| 2016/0212099 A1* | 7/2016 | Zou ................. H04L 63/1408 |
| 2016/0248746 A1* | 8/2016 | James ................. H04L 67/12 |
| 2016/0301707 A1* | 10/2016 | Cheng ................. H04L 67/12 |

(Continued)

OTHER PUBLICATIONS

"IoT Device Management Market Size, Trend, Industry Report 2018-2025," Grand View Research, Inc., Mar. 2018, 7 pages. <https://www.grandviewresearch.com/industry-analysis/iot-device-management-market>.

(Continued)

*Primary Examiner* — Daniel B Potratz
*Assistant Examiner* — Matthias Habtegeorgis
(74) *Attorney, Agent, or Firm* — Rachel M. Yadlosky

(57) ABSTRACT

A computer-implemented method for provisioning an Internet of Things (IoT) device comprises receiving, at a device provisioning system, an event schema for the IoT device. The method further comprises comparing the one or more event types from the event schema with a plurality of combinations of one or more event types in a device type schema list to identify a match between the one or more event types in the event schema from the IoT device and one of the plurality of combinations of one or more event types in the device type schema list; in response to identifying a match, assigning a device type to the IoT device based on a correlation in the device type schema list for the device type and the matched combination of one or more event types; and provisioning the IoT device with validated credentials based on the assigned device type.

20 Claims, 7 Drawing Sheets

(56) References Cited

U.S. PATENT DOCUMENTS

| | | | |
|---|---|---|---|
| 2017/0005871 A1 | 1/2017 | Smith | |
| 2017/0171196 A1* | 6/2017 | Britt | |
| 2018/0137261 A1* | 5/2018 | Lattin | H04W 4/70 |
| 2018/0234326 A1* | 8/2018 | Swierk | H04L 69/08 |
| 2018/0316511 A1* | 11/2018 | Meyer | G06F 9/45558 |
| 2019/0058586 A1* | 2/2019 | Kumar | H04L 67/34 |
| 2019/0387011 A1* | 12/2019 | Du | H04L 63/20 |
| 2020/0153697 A1 | 5/2020 | Turner et al. | |
| 2020/0162556 A1* | 5/2020 | Wood | H04L 67/12 |
| 2020/0177589 A1 | 6/2020 | Mangalvedkar et al. | |
| 2021/0105591 A1* | 4/2021 | Sharma | H04M 15/8083 |
| 2021/0126835 A1 | 4/2021 | Turner et al. | |
| 2021/0193334 A1* | 6/2021 | Turrin | G05B 17/02 |
| 2021/0335505 A1* | 10/2021 | Tedaldi | G06K 9/6282 |
| 2022/0121965 A1* | 4/2022 | Chatterji | G06F 16/23 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

INTERNET OF THINGS DEVICE PROVISIONING

BACKGROUND

The internet of things (IoT) is a system of interrelated computing devices, mechanical or digital machines, objects, animals and/or people that are provided with unique identifiers (UIDs). The IoT allows for the ability to transfer data over computer networks without requiring human-to-human or human-to-computer interaction. The device or object (i.e., the "thing") in the internet of things, can include, for example, a heart monitor implant, home appliances, lightbulbs, an automobile with built in sensors and/or any device that can be assigned an IP address that can be capable of transferring data over a computer network.

An IoT ecosystem can comprise internet-enabled devices that use embedded processors sensors and communication hardware to collect, send and act on data acquired from the IoT device's surrounding environment. IoT devices can share the data they collect by connecting to an IoT gateway or other edge device, wherein the data can be sent to a cloud computing environment or analyzed by locally operating computer systems. IoT devices can communicate with one another or other related devices on the computer network. The connectivity, networking and communication protocols used, can allow for the IoT devices to interact without much, if any human interaction, and be used to monitor business processes, improve customer experiences, enhance productivity, influence business decisions and integrate or adapt business models.

SUMMARY

Aspects of the disclosure may include a computer-implemented method, computer program product, and system. One example of the computer-implemented method for provisioning an Internet of Things (IoT) device comprises receiving, at a device provisioning system, an event schema for the IoT device. The event schema includes one or more event types collected by the IoT device. The method further comprises comparing the one or more event types from the event schema with a plurality of combinations of one or more event types in a device type schema list to identify a match between the one or more event types in the event schema from the IoT device and one of the plurality of combinations of one or more event types in the device type schema list; in response to identifying a match, assigning a device type to the IoT device based on a correlation in the device type schema list for the device type and the matched combination of one or more event types; and provisioning the IoT device with validated credentials based on the assigned device type.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
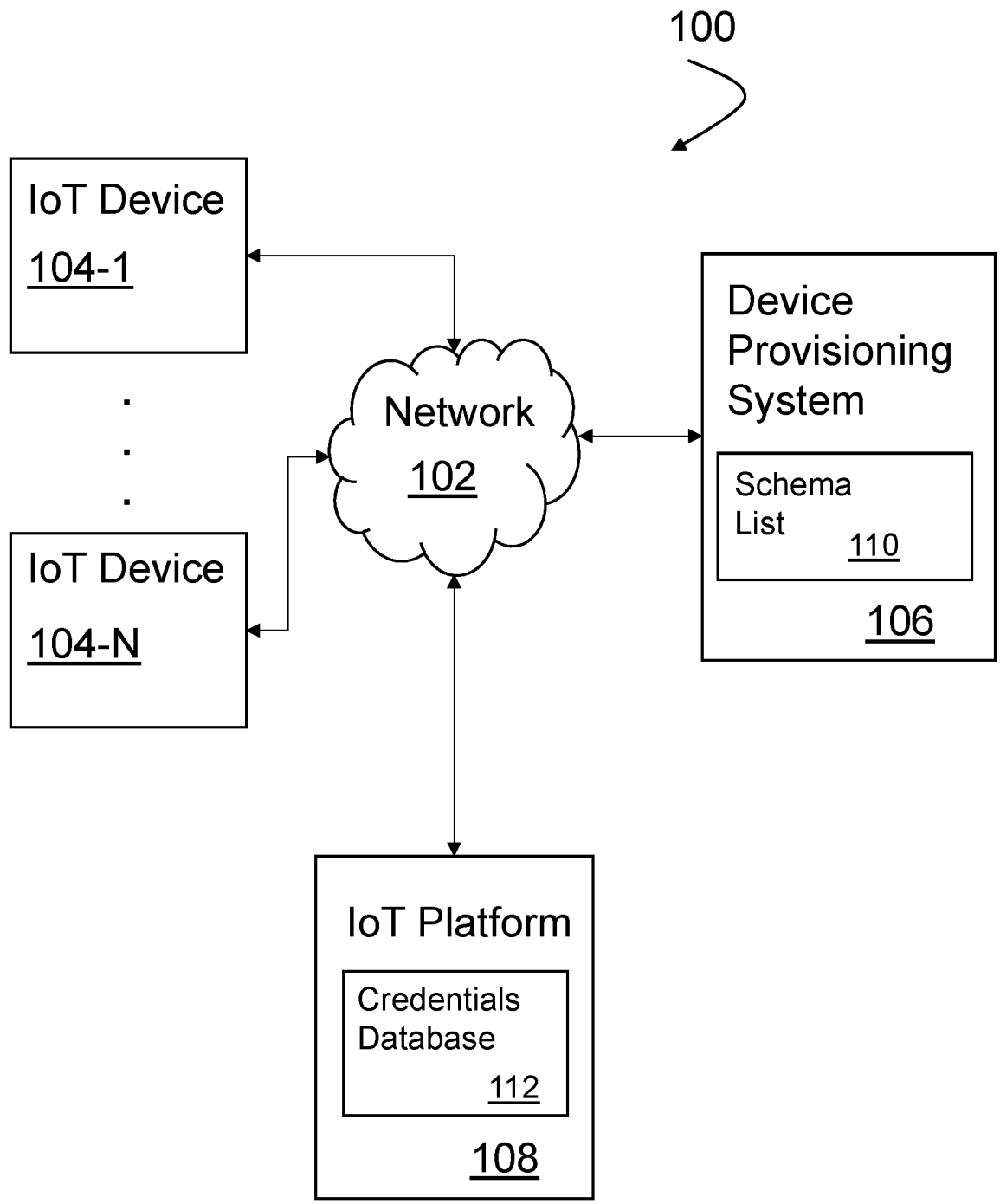
FIG. 1 is block diagram of one example embodiment of an example computing environment capable of automating IoT device registration based on sample event data received from IoT devices.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts a block diagram of one example embodiment of an example computing environment 100 capable of automating IoT device registration based on sample event data received from IoT devices, in accordance with the embodiments of the present disclosure. The embodiment of the computing environment 100 shown in FIG. 1 includes a plurality of computer systems and devices interconnected via a computer network 102. The network 102 can be implemented using any number of any suitable physical and/or logical communications topologies. The network 102 may include one or more private or public computing networks. For example, network 102 may comprise a private network (e.g., a network with a firewall that blocks non-authorized external access) that is associated with the workload. Alternatively, or additionally, network 102 may comprise a public network, such as the Internet. Thus, network 102 may form part of a packet-based network, such as a local area network, a wide-area network, and/or a global network such as the Internet. Network 102 can include one or more servers, networks, or databases, and can use one or more communication protocols to transfer data between the devices and systems interconnected via the network 102. Thus, examples of network 102 can include a local area network (LAN), home area network (HAN), wide area network (WAN), back bone networks (BBN), peer to peer networks (P2P), campus networks, enterprise networks, the Internet, cloud computing networks and/or any other network known by a person skilled in the art.

Furthermore, although illustrated in FIG. 1 as a single entity, in other examples, network 102 may comprise a plurality of networks, such as a combination of public and/or private networks. The communications network 102 can include a variety of types of physical communication channels or "links." The links can be wired, wireless, optical, or any other suitable media. In addition, the communications network 102 can include a variety of network hardware and software for performing routing, switching, and other functions, such as routers, switches, base stations, bridges or any other equipment that may be useful to facilitate communicating data.

The plurality of computer systems and devices interconnected via network 102 in this example include a device provisioning system 106 that is configured to implement a provisioning service, an IoT platform 108, and a plurality of IoT devices 104-1 . . . 104-N (hereinafter referred to generally as "IoT device 104"), where N represents the total number of IoT devices. Although only one IoT platform is depicted in this example for ease of explanation, it is to be understood that, in other embodiments, more than one IoT platform 108 can be utilized. Similarly, it is to be understood that the number of IoT devices 104 is not be limited to the number depicted in the drawings. That is, although two IoT devices 104 are depicted in FIG. 1, it is to be understood that more than two IoT devices can be utilized in other embodiments. In particular, the number of IoT devices 104, IoT platforms 108 or any other duplicated components or systems being presented by the drawings, can be any number supported by network 102 and the computing environment.

Embodiments of the IoT devices 104, IoT platform 108 and device provisioning system 106 may each be a specialized computer system comprising specialized configurations of hardware, software or a combination thereof as shown and described herein. Embodiments of the device provisioning system 106, IoT platform 108 and other network accessible systems may be desktop computers, laptop computers, tablet computers, smartphones, server computers, or any other computer system known in the art. In some embodiments, IoT platform 108, device provisioning system 106, and/or other network accessible systems, may represent computer systems utilizing clustered computers and components to act as a single pool of seamless resources when accessed through network 102. For example, such embodiments may be used in data center, cloud computing, storage area network (SAN), and network attached storage (NAS) applications.

In some embodiments, the IoT platform 108, device provisioning system 106 and/or other network accessible systems may represent virtual machines provisioned by a host computer on the network 102. For example, the device provisioning system 106 and/or IoT platform 108 can host a plurality of virtual machines accessing and/or provisioning each IoT device 104. In some embodiments, an IoT device 104 can have embedded virtualization characteristics, allowing for an IoT device 104 to be provisioned with a management layer along with separate slots capable of being assigned one or more types of functionality to be provisioned thereto. An IoT device 104 that has virtualization capabilities, may be capable of being provisioned for a plurality of functions on the original hardware of the IoT device 104.

IoT devices 104 can be any physical device or object embedded with electronics, circuitry, software, sensors, actuators and/or connectivity hardware which may enable IoT devices 104 to connect to a computer network 102, collect data or exchange data. For example, IoT devices can include refrigerators, microwave ovens, conventional ovens, light switches, doorbells, air conditioning systems, water heaters, temperature sensors, or any other device configured to communicate over the network 102 to collect and/or send data. In many instances, the specific devices are enabled to communicate over the network by embedding a generic communication chip into the device. That is, the same type of communication chip or module can be embedded into different types of devices. For example, both a refrigerator and a microwave oven can be embedded with the same type of communication chip. In some embodiments, the communication chip can be manufactured by a third party for placement in devices manufactured by other manufacturers.

The modular capability of communication chips to be used in different types of devices provides efficiency in cost and manufacturing. However, it becomes very difficult to impossible to track or know before hand into which type of a device a given communication chip will be embedded. This presents a technical challenge for properly provisioning the communication chip to enable it to communicate with the IoT platform 108. As understood by one of skill in the art, device provisioning is the process of attaching a certificate to the device identity. The device identity is used to uniquely identify a specific device and can be used for features such as, but not limited to, providing push notifications and performing reports. For example, the system uses the device identity to identify to which device the notification is being sent or to identify how many devices are using the server, etc. Knowing the device identity also enables many security integration possibilities, such as, for example, deciding which IoT devices are allowed to communicate with a given IoT platform. Additionally, knowing the device identity can enable more specific and relevant reports and processing of data from the devices. Furthermore, security updates may only be relevant to certain device types. However, without knowing in which type of device the communication module/chip is located, the updates may be rolled out to more devices than is needed.

Some conventional techniques for addressing this provisioning issue involve manual intervention in the device provisioning process. However, the number of IoT devices is currently in the billions and is expected to increase exponentially. Considering the volume of devices, it is ineffective to provision devices manually at scale. Other conventional techniques oversimplify the device provisioning process, such as by assigning any device from a given manufacturer to the same device type. However, the embodiments described herein, enable an automatic device provisioning process while also enabling more complex procedures to be implemented such that the provisioning process more accurately provisions the devices based on actual device type.

In particular, as described herein, the device provisioning system 106 enables the automatic detection of the device type based on sample event data provided by the given IoT device 104. Sample event data refers to actual events published by the IoT device. The event data published by an IoT device will depend on the type of device. For example, a refrigerator may publish event data related to temperature readings, measurements of pressure in a condenser, etc. However, a microwave oven may collect and publish, for example, event data related to electromagnetic (EM) radiation levels. Thus, the specific event data collected and published by an IoT device will vary based on the type of device.

The device provisioning system 106 is configured to analyze sample event data from IoT devices 104 to identify the respective device type for each of the IoT devices. The identified device type is then provided to the IoT platform 108 to be used in provisioning the IoT devices 104 based on their identified device type.

In operation, one or more of the IoT devices 104 request to connect to the IoT platform 108 by submitting a request for registration of the IoT device 104 via network 102. As discussed above, embodiments of an IoT device 104 may refer to physical objects that may be embedded with technology allowing for network communication with other IoT devices 104, computer systems, servers, gateways and the environments external to the IoT device 104. IoT devices 101 may be connectable to the Internet and may include properties, parameters and attributes that may be typical of a network enabled computer system, such as an IP address and MAC address. Examples of IoT devices 104 can include, but are not limited to security systems, speakers, home appliances, toys, televisions, thermostats, smoke alarms, cameras, sensors, lighting systems, automobiles, or any other object that can be embedded with network enabled communication technology. An example IoT device is discussed in more detail with respect to FIG. 3.

In addition to the provisioning request, the IoT devices 104 are configured to also provide an event schema document (also referred to herein as "event schema" or "schema") to the device provisioning system 106. The event schema document defines properties of event data, such as the event name and type. In particular, the event schema document is used for defining attributes for event data provided to the device provisioning system 106. Thus, the event schema document functions similar to an XML Schema Document (XSD), but is used for event data in an IoT ecosystem. In some embodiments, the sample event data can be provided as part of the event schema document. In other embodiments, the event data and event schema are provided separately. In addition, as used herein, the term event type refers to the type of event rather than the specific value of the data. Example event types include, but are not limited to, status, reading, measurement, etc. For example, status can refer to the status of a component (e.g. operational, stand-by, etc.) while reading or measurement can indicate that the value was measured at a given point in time (such as a temperature reading). Additionally, the type can be more specific in some embodiments, such as temperature reading, pressure reading, ambient light measurement, etc.

Based on the specific event types and event schema provided by the IoT device 104, the device provisioning system 106 is able to identify the device type for the given IoT device. In particular, the device provisioning system 106 maintains a schema list 110 which correlates different combinations of event types to different device types. For example, the schema list 110 may indicate that the event types of condenser pressure reading and temperature reading together correlate with a device type of refrigerator. Thus, the device provisioning system 106 is configured to identify a match between the event types provided with the event schema from an IoT device 104 with a grouping of event types in the schema list 110 to identify the device type of the given IoT device. If a match is found, the IoT device is classified as that device type. The device type classification is provided to the IoT platform 108 for use in validating credentials of the IoT device 104. In some embodiments, the device provisioning system is configured to validate credentials of the IoT device 104. For example, in some such embodiments, the IoT platform 108 and the device provisioning system 106 are implemented as a single system as opposed to the separate systems depicted in FIG. 1.

An IoT platform 108 may refer to supporting software that connects hardware (such as the IoT device 104), access points and networks to end-user applications accessible via the IoT platform 108. An IoT platform 108 may handle management tasks and data visualization, allowing users to automate the physical environment and computing environment 100. Embodiments of the IoT platform 108 may perform a plurality of functions within the computing environment 100 including the functions of a data controller, a gateway device, a communications network, data analyzer, data translator and/or an application service (including an end-user application or the functionality of device provisioning system 106 in some embodiments). Embodiments of the IoT platform 108 can act as middleware between the remotely connecting IoT devices 104 and one or more applications or devices that may be connected or accessible via the IoT platform 108.

The IoT platform 108 is also responsible in this embodiment for issuing or maintaining a credentials database 112 comprising authenticated credentials. The IoT platform 108 can compare credentials received from an IoT device 104 with the verified credentials of the credentials database 112 and confirm to the device provisioning system 106 whether or not the credentials presented by the IoT device 104 are in fact authentic. As mentioned above, in some embodiments the device provisioning system 106 can be responsible for maintaining the credentials database 112.

Embodiments of an IoT platform 108 may be responsible for enabling one or more functions of the IoT device 104 registered to the IoT platform 108. For example, an IoT platform 153 can equip or enable IoT devices 101 with real-time monitoring functions, remote control functionality, configurable alerts, notifications and pluggable cloud services. Embodiments of an IoT platform 108 may also integrate IoT devices 104 with mobile computing devices, smartphone technologies and applications. Additional examples of IoT platform applications in the realm of IoT devices 104 may include remote monitoring of IoT devices 104 and vehicles equipped with IoT devices 104, predicting maintenance on equipment, collecting sensor data for real-time analytics in various fields, such as, but not limited to, healthcare, hospitality and travel including monitoring the end-to-end movement of physical good/products. IoT platforms 108 may harness large networks of registered IoT devices 104 for large-scale solutions, including using a network of IoT devices 104 for smart city infrastructure, and public services including electric grid metering, air quality monitoring and controlling the functionality of "smart" buildings.

Embodiments of an IoT platform 108 may also be referred to as an IoT cloud when the IoT platform 108 operates using a cloud computing environment, such as the example cloud computing environment described below. An IoT platform 108 operating as an IoT cloud may be utilized as a platform-as-a-service (PaaS). An IoT PaaS may allow for users and clients to rent cloud infrastructure, the IoT platform 108 and even the IoT device 104 all from a single technology provider.

Thus, by enabling the device provisioning system 106 to automatically identify a device type for the IoT devices 104 based on the event data, the embodiments described herein can improve the effectiveness and security in provisioning and registering IoT devices 104 to an IoT platform 108. An example device provisioning system is described in more detail below with respect to FIG. 2.

Figure 2:
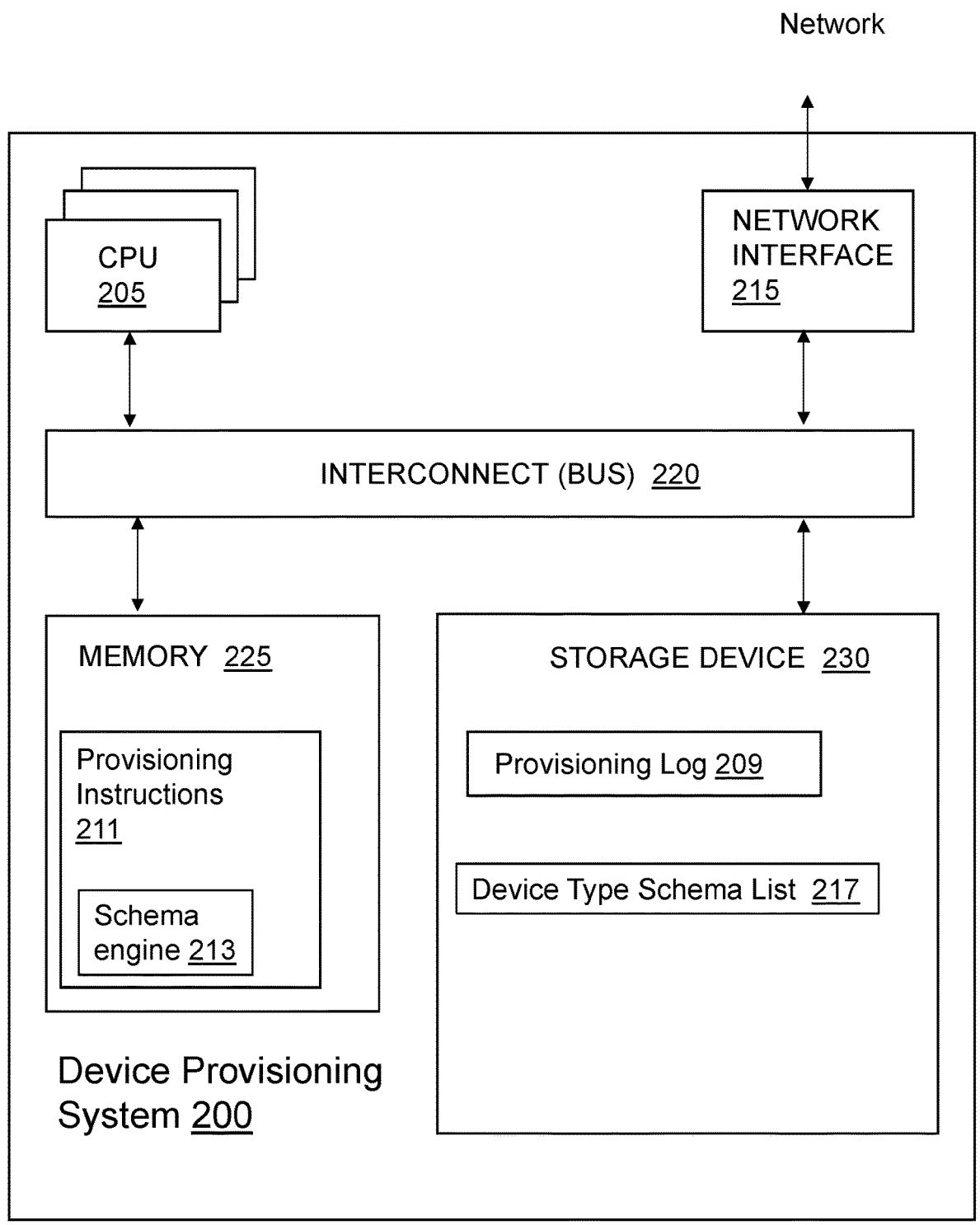
FIG. 2 is a high-level block diagram of one embodiment of an example device provisioning system.

FIG. 2 is a high-level block diagram of one embodiment of an example device provisioning system 200. The device provisioning system 200 can be implemented as device provisioning system 106 in FIG. 1. In the example shown in FIG. 2, the device provisioning system 200 includes a memory 225, storage 230, one or more processors 205 (also referred to as CPU 205 herein), and a network interface 215 communicatively coupled via an interconnect (e.g., BUS) 220. It is to be understood that the device provisioning system 200 is provided by way of example only and that the device provisioning system 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices communicatively coupled to the device provisioning system 200 via a communication network coupled to the network interface 215.

In some embodiments, the memory 225 stores provisioning instructions 211 and the storage 230 stores provisioning log 209 and device type schema list 217. However, in various embodiments, the provisioning instructions 211, provisioning log 209 and device type schema list 217 are stored partially in memory 225 and partially in storage 230, or they are stored entirely in memory 225 or entirely in storage 230. Additionally, although storage 230 is depicted as a single monolithic entity and the memory 225 is depicted as a single monolithic entity, it is to be understood that, in other embodiments, the storage 230 and/or the memory 225 can each be comprised of a plurality of separate memory devices.

When executed by the CPU 205, the provisioning instructions 211 cause the CPU 205 to automatically identify a device type for each IoT device based on event data provided by the IoT device, as described herein. In particular, the provisioning instructions 211 include instructions for a schema engine 213. The schema engine 213 is configured to compare event types received from an IoT device to event types stored in the device type schema list 217. When a match is found, the provisioning instructions 211 classify the IoT device as the device type indicated in the match identified from the device type schema list 217. Additionally, the provisioning instructions 211 cause the CPU 205 to maintain entries in the provisioning log 209 during the provisioning process. For example, in some embodiments, the provisioning instructions 211 cause the CPU 205 to perform a method such as method 400 and/or method 500 during provisioning of an IoT device.

Furthermore, as discussed above, in some embodiments, one or more of the components and data shown in FIG. 2 include instructions or statements that execute on the processor 205 or instructions or statements that are interpreted by instructions or statements that execute on the processor 205 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system.

Figure 3:
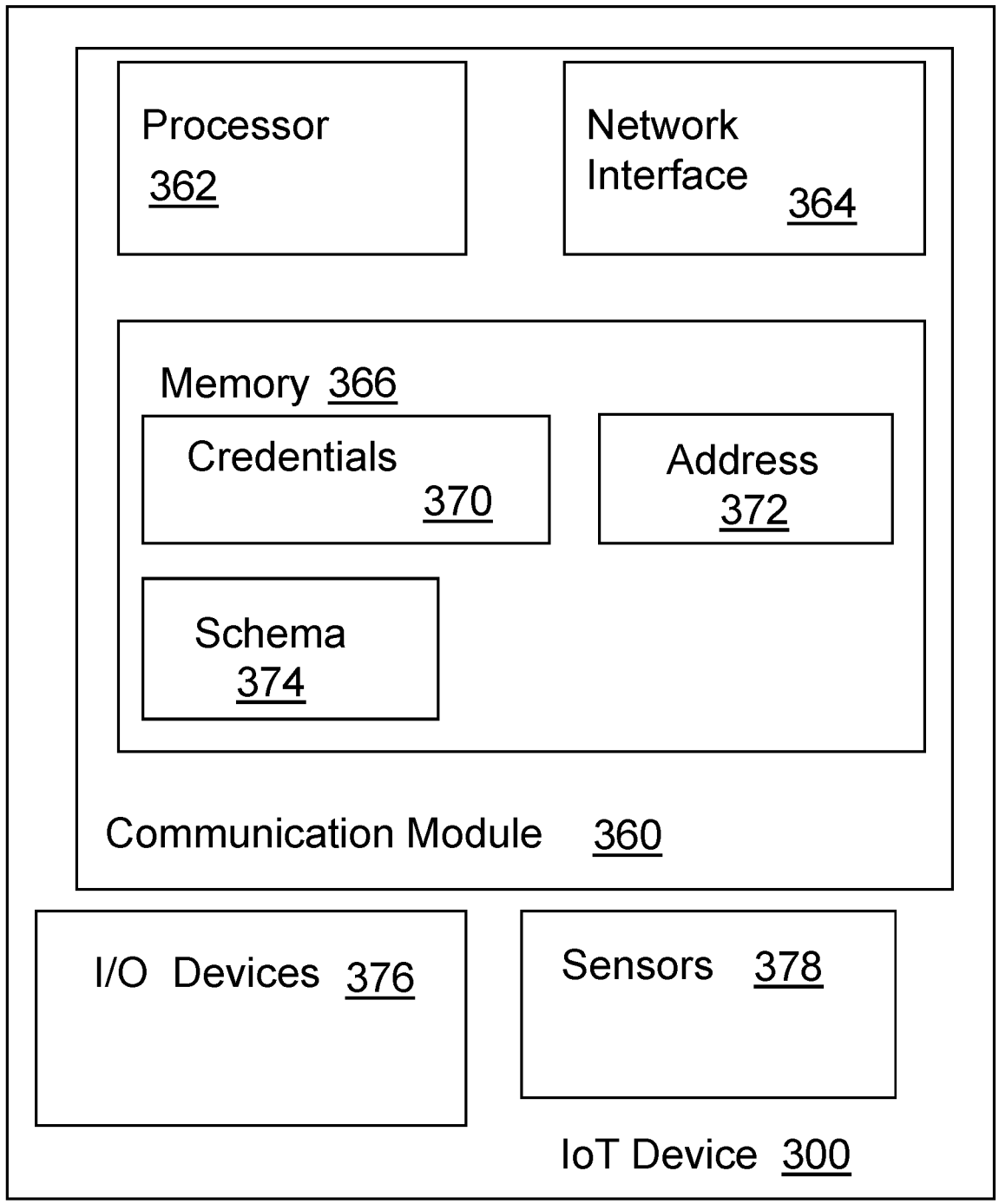
FIG. 3 is a high-level block diagram of one embodiment of an example IoT device.

FIG. 3 is a high-level block diagram of one embodiment of an example IoT device 300. The IoT device 300 can be implemented as an IoT device 104 in FIG. 1. The example IoT device 300 includes a communication module 360. As discussed above, the communication module 360 can be manufactured as a generic module which can be included in many different types of devices, in some embodiments. In this example, the communication module 360 includes a processor 362, a network interface 364, and a memory 366. The network interface 364 is configured to enable communication over a network, such as network 102, with an IoT platform and device provisioning system, such as IoT platform 108 and device provisioning system 106.

In this example, the memory 366 includes credentials 370, address 372, and schema 374. The credentials 370 are network connection information and authenticating documentation. In the example shown in FIG. 3, the credentials 370 are stored within memory 366 on the IoT device 300. However, in other embodiments, the credentials 370 can be accessible via a network accessible storage device. Embodiments of the credentials 370 may store authentication information that may be used for accessing the IoT platform. Examples of credentials can include user/password combinations, a security token or a digital certificate. One or more combinations of credentials may be implemented for added security.

Credentials 370 may allow for computing systems, platforms, and networks to verify the authenticity of the IoT device 300, to ensure that unauthorized devices are not impersonating a legitimate IoT device 300. For example, digital certificates, may use public keys, private keys or digital signatures issued by a digital certificate manager responsible for maintaining the credentials 370 of the IoT device 300. The digital keys and/digital signature can be matched to digital certificates being presented by the IoT device 300 at the time of IoT device 300 registration, to verify authenticity of the credentials 370. Examples of digital certificates may include server or client certificates, which may communicate securely using secure sockets layer (SSL), object signing certificates comprising a digitally signed object, and signature verification certificates. The most common format for a public key certificate that may be used may be a digital certificate issued in the X.509 format.

Credentials 370, maintained as digital certificates, security tokens and default user names/passwords may be pre-loaded onto the IoT device 300 by the manufacturer of the communication module 360, distributor or administrator of the IoT device 300. Pre-loaded credentials 370 may allow for the IoT device 300 to reach out to an IoT platform in order to register the IoT device 300 for the first time and prove that that the IoT device 300 is authentic. In some embodiments, during the registration of the IoT device 300, credentials 370 may be modified by the device provisioning system or the IoT platform. For example, during the registration of the IoT device 300, a new user name/password combination may be set in order to access IoT platform. Alternatively, during registration of the IoT device 300, the device provisioning system can issue new credentials by issuing a new digital certificate or security token to the IoT device 300 as part of the registration process.

In some embodiments, such as depicted in the example of FIG. 3, the IoT device 300 is pre-programmed or embedded with a URL or other network address protocol 372 (referred to herein generically as "address 372"). In some embodiments, the address 372 may point the IoT device 300 to the device provisioning system or the IoT platform associated with using the IoT device 300. Upon navigating to the URL or network address embedded in the IoT device 300, the IoT device 300 may connect to the device provisioning system and initiate the automatic registration of the IoT device 300.

For example, the IoT device 101 may initially be directed toward the URL of an IoT platform. However, the IoT device 300 may be identified as an unregistered device and subsequently be re-directed to the device provisioning system to complete the registration process first before accessing the IoT platform.

In the example shown in FIG. 3, the memory 366 also stores schema 374. The schema 374 includes information regarding the event types collected and published by the IoT device 300, as discussed above. The IoT device 300 also includes, in this embodiment, one or more Input/Output (I/O) devices 376 and one or more sensors 378. The one or more I/O devices 376 enable the IoT device to interact with a user and/or other IoT devices in an environment around the IoT device. For example, the I/O devices 376 can include, but are not limited to, display screens, speakers, microphones, control panels, etc. The one or more sensors 378 are each configured to collect data regarding the IoT device. For example, the sensors 378 can include, but are not limited to, temperature sensors, pressure sensors, light sensors, timers, etc. The sensors 378 and/or the I/O devices 376 provide the event data related to schema 374 of the IoT device 300 which is provided to the device provisioning system for automatic identification of the device type of the IoT device 300.

It is to be understood that the IoT device 300 is provided by way of example only and that the IoT device 300 can be implemented differently in other embodiments. For example, it is to be understood that, in other embodiments, other components in addition to or in lieu of those shown can be used and that some components shown in FIG. 3 can be omitted. For example, in some embodiments, the I/O devices 376 can be omitted. Additionally, in some other embodiments, the processor 362 is not implemented as part of the communication module 360.

Figure 4:
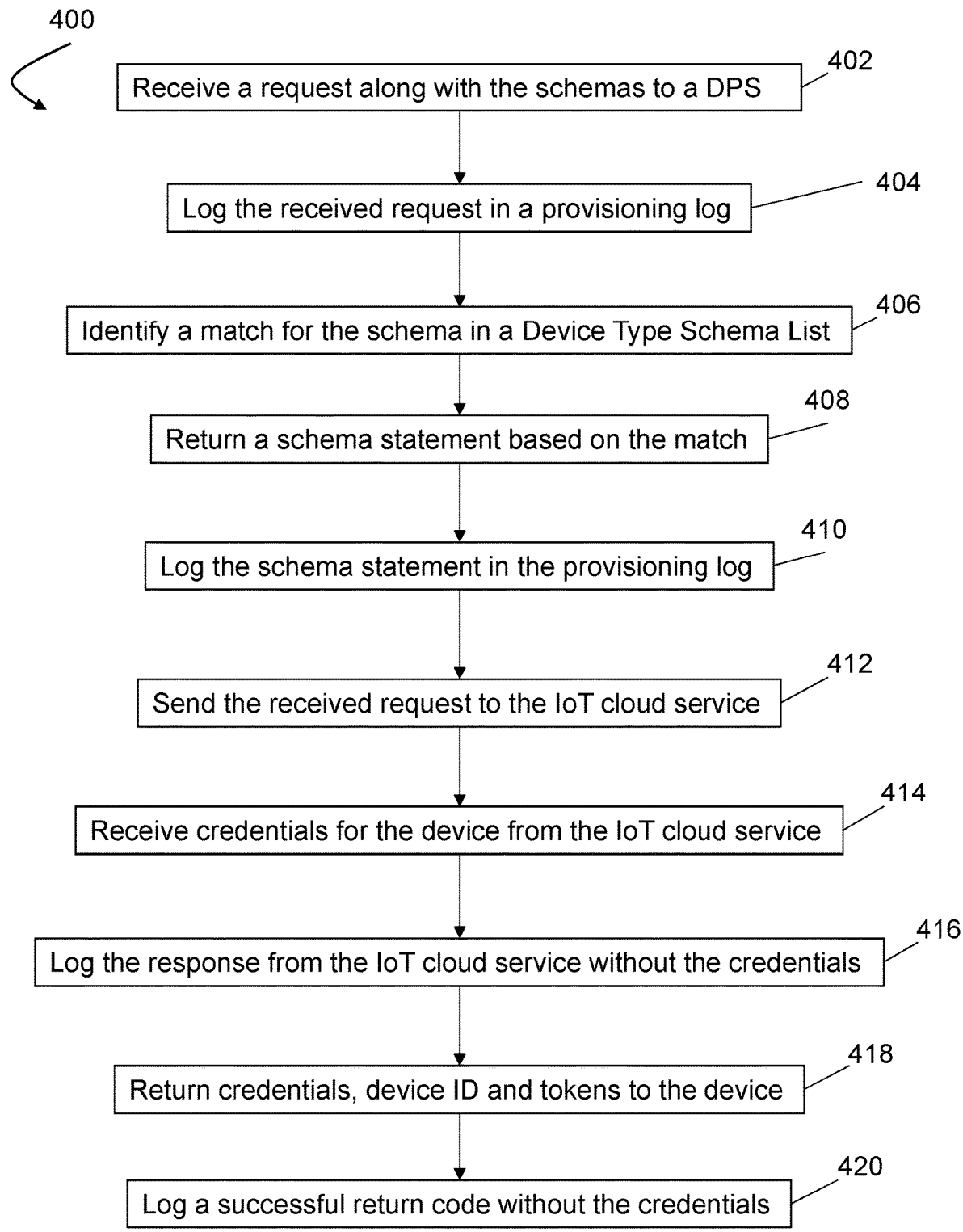
FIG. 4 is a flow chart depicting one embodiment of an example method of provisioning an IoT device.

FIG. 4 is a flow chart depicting one embodiment of an example method 400 of provisioning an IoT device. The method 400 can be implemented by a device provisioning system such as device provisioning system 106 or 200. For example, the method 400 can be implemented by a CPU, such as CPU 205 in device provisioning system 200, executing instructions, such as provisioning instructions 211. It is to be understood that the order of actions in example method 400 is provided for purposes of explanation and that the method can be performed in a different order in other embodiments. Similarly, it is to be understood that some actions can be omitted or additional actions can be included in other embodiments.

At 402, a provisioning or registration request along with an event schema containing event type data is received from an un-provisioned IoT device at a device provisioning service (DPS). In some embodiments, a uniform resource locator (URL) or other network address for the device provisioning service is burned or preloaded into the IoT device by the IoT device manufacturer. In this way, the IoT device is able to send the request and event schema directly to the device provisioning service. In other embodiments, a URL or other network address for the device manufacturer is preloaded into the IoT device. In such embodiments, the device manufacturer can re-direct the request and event schema to the device provisioning service. Similarly, in other embodiments, the IoT device is preloaded with a URL or other network address for the IoT platform and the IoT platform redirects the initial request and schema to the device provisioning service.

At 404, the device provisioning service logs the received request, such as in provisioning log 209 of FIG. 2. At 406, the device provisioning service executes a schema engine which is configured to compare the event type data in the received event schema with the content of a device type schema list, such as device type schema list 217, to identify a match. The device type schema list can be pre-populated with different combinations of event type data and corresponding device types, in some embodiments. In other embodiments, the device provisioning service is configured to build and/or update the device type schema list based on the received event schemas from IoT devices, such as is described in the example method 500, below. Furthermore, it is to be understood that in some embodiments, the device provisioning system can be implemented via multiple distributed devices. In such embodiments, the schema engine can be implemented on a device that is different from the device configured to communicate with the IoT devices.

At 408, a schema statement is returned to the device provisioning system in response to identifying a schema match. As used herein, returning the schema statement to the device provisioning service can refer to generating the schema statement and/or providing the schema statement from one component of the device provisioning system to another component of the device provisioning system. For example, as discussed above, one device can be configured to implement the schema engine and another can be configured to communicate with the IoT devices. The identified schema match is an indication that a combination of one or more event types in the device type schema list matches the one or more event types in the received event schema from the IoT device. Thus, based on the match, the device provisioning system is able to classify the IoT device type in the schema statement.

At 410, the schema statement is logged in the provisioning log. At 412, the provisioning request is sent to the IoT platform (also referred to as IoT cloud service). Additionally, along with the provisioning request, the device provisioning system sends identified device type in the schema statement to the IoT platform. In this way, the IoT platform can verify the credentials, as discussed above, as well as register the IoT device based on the identified device type. As discussed above, this enables various advantages, such as, but not limited to, improved reporting based on device type, improved tracking and roll-out of updates/repairs, improved security to prevent impersonation of a device, etc.

At 414, the device provisioning service receives validated credentials from the IoT platform, as discussed above. For example, in response to validating the credentials received from the IoT device, the IoT platform can return a signed certificate to the device provisioning system for sending to the IoT device. At 416, the response from the IoT platform, without the validated credentials, is logged. In other words, the event of receiving the validated credentials is logged, but the device provisioning system does not log the actual validated credentials in the provisioning log. At 418, the validated credentials, device ID, tokens, etc. are returned to the IoT device being provisioned. At 420, a successful return code from the IoT device is received and logged without logging the exact credentials.

It is to be understood that method 400 is provided by way of example and that, in other embodiments, modifications to method 400 can be implemented. For example, one or more of the logging actions can be omitted or modified. Similarly, in some embodiments, the device provisioning system can be implemented as part of the IoT platform and, as such, the device provisioning system can perform the validation of the received credentials.

Figure 5:
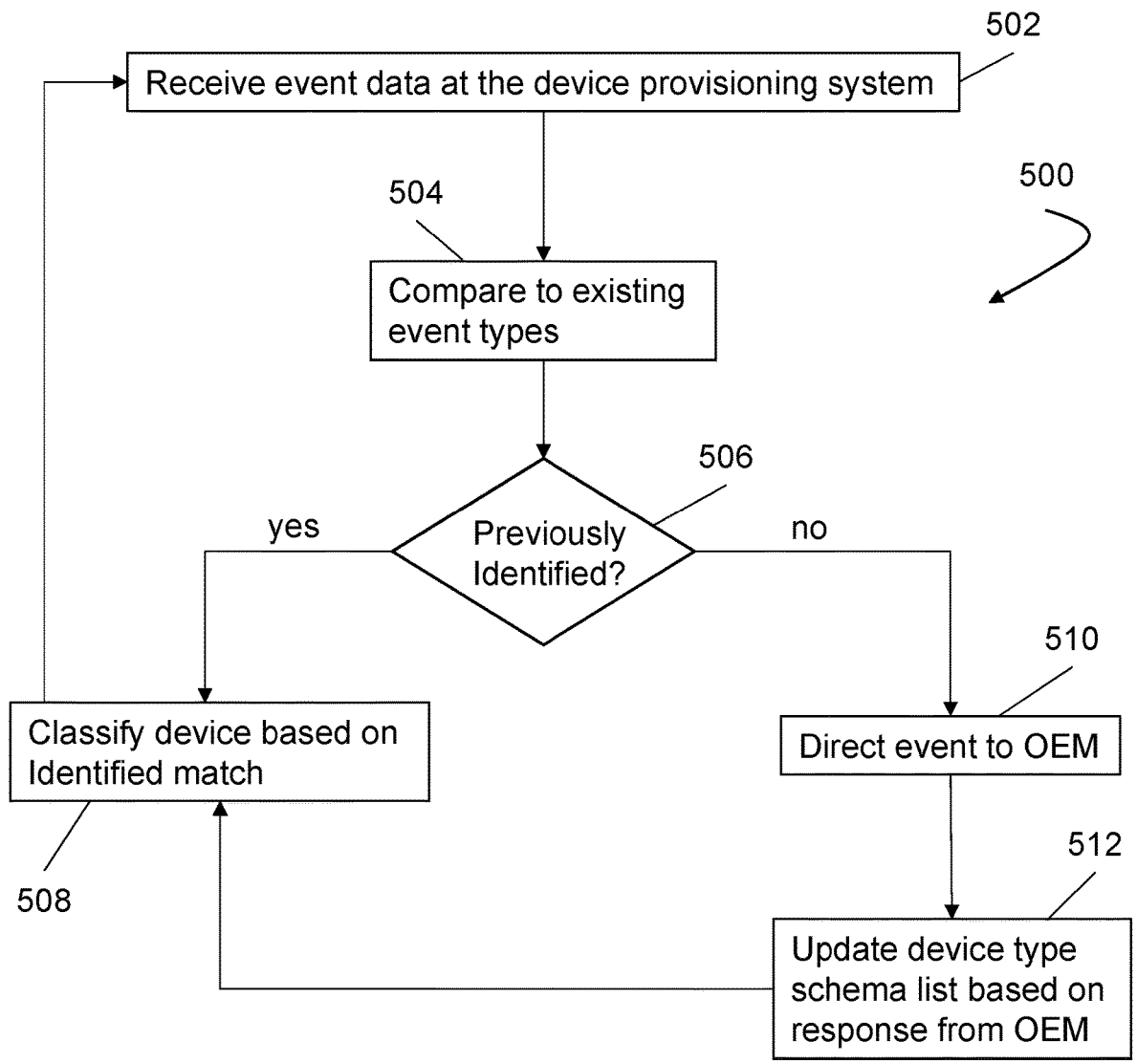
FIG. 5 is a flow chart depicting another embodiment of an example method 500 of provisioning an IoT device.

FIG. 5 is a flow chart depicting another embodiment of an example method 500 of provisioning an IoT device. The method 500 can be implemented by a device provisioning system such as device provisioning system 106 or 200. For example, the method 500 can be implemented by a CPU, such as CPU 205 in device provisioning system 200, executing instructions, such as provisioning instructions 211. It is to be understood that the order of actions in example method 500 is provided for purposes of explanation and that the method can be performed in a different order in other embodiments. Similarly, it is to be understood that some actions can be omitted or additional actions can be included in other embodiments.

The example method 500 enables the device provisioning system to create and/or update a device type schema list based on event data received from IoT devices. For example, as discussed above, in some embodiments, a device type schema list can be prepopulated with associations between device types and combinations of one or more event types. In the event that a combination or pattern of event types received from an IoT device does not match a saved event type combination in the device type schema list, the method 500 enables the device type to be identified and the device type schema list to be updated. Additionally, if the device type schema list is not prepopulated, method 500 enables the device type schema list to be created.

At 502, a provisioning request along with an event schema is received at a device provisioning system from a communication module of an IoT device to be provisioned, as discussed above. The communication module enables the IoT device to communicate with the device provisioning system. For the first event schema and provisioning request received from the device, the information for where to direct the event schema can be hard-wired or preloaded either to the device manufacturer, the IoT platform, or the device provisioning system, as discussed above. In case it is hardwired to the device manufacturer's site, the site redirects the request to the IoT platform or the device provisioning system. At 504, the device provisioning system compares the event data from the event schema to determine if there is a match in the device type schema list. In other words, it is determined if the device type associated with the event data has been identified previously.

If it is determined at 506 that the device type for the received event data (e.g. event type combinations as discussed above) has been identified previously, the IoT device is classified at 508 with the corresponding device type and provisioned with the given credentials which are returned back to the IoT device, as discussed above. If it is determined at 506, that the device type for the received event data has not been previously identified, the device provisioning system directs the event schema and credentials received from the IoT device to the original equipment manufacturer (OEM) of the IoT device, at 510, to determine the device type. The information for directing the event to the OEM can be hardwired or preloaded a priori. In the example of communication modules which are manufactured by a third party and embedded in the IoT device, the OEM referred to is the OEM of the IoT device as opposed to the manufacturer of the communication module. The OEM is able to check the hardcoded credentials, assign a device type, and return it back to the device provisioning system. For example, the hardcoded credentials can include a serial number for the device provided by the OEM. In such a situation, the OEM can provide the device type based on the serial number communicated to it by the device provisioning system. At 512, the device provisioning system updates the device type schema list based on the response from the OEM. The DPS now has a correlation between the received event types from the IoT device and a device type for future processing.

The method 500 then proceeds to 508 where the IoT device is classified and provisioned based on the identified device type, as discussed above. Method 500 then returns to 502 for receiving subsequent event data from the same or other IoT devices. Thus, only the first time an event schema and request is sent does an IoT device get provisioned. Afterwards, the IoT platform identifies the IoT device as the IoT device sends the requests with the verified credentials provided by the IoT platform in the provisioning process. Also, the DPS ensures that the first event gets persisted and forwarded to the IoT platform after checking with the OEM for the device type when necessary. If more than one IoT device sends similar event types, the device type would be the same for the different IoT devices, whereas the device IDs would be returned back uniquely. Thus, the updated device type schema list can be used to identify subsequent IoT devices which are of the same device type, but not necessarily from the same manufacturer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
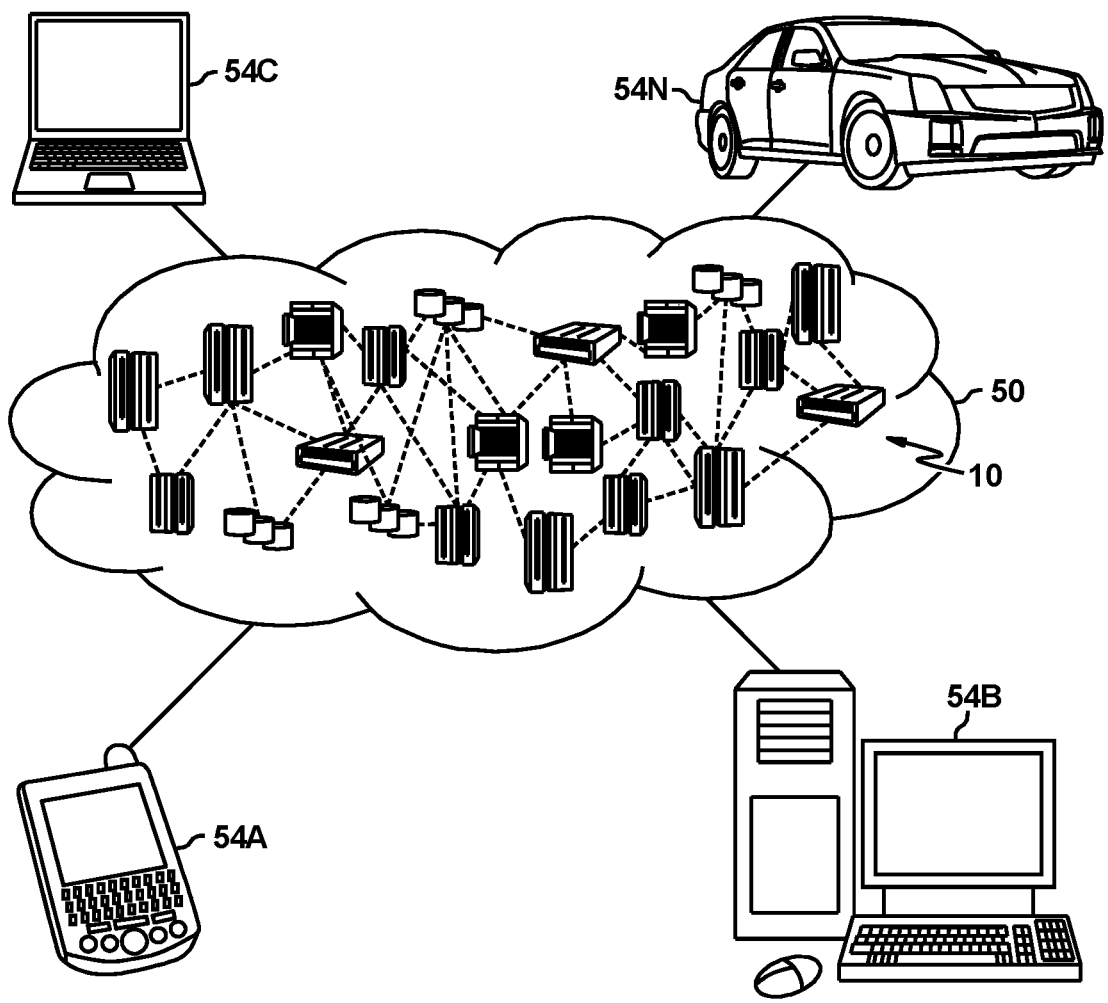
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
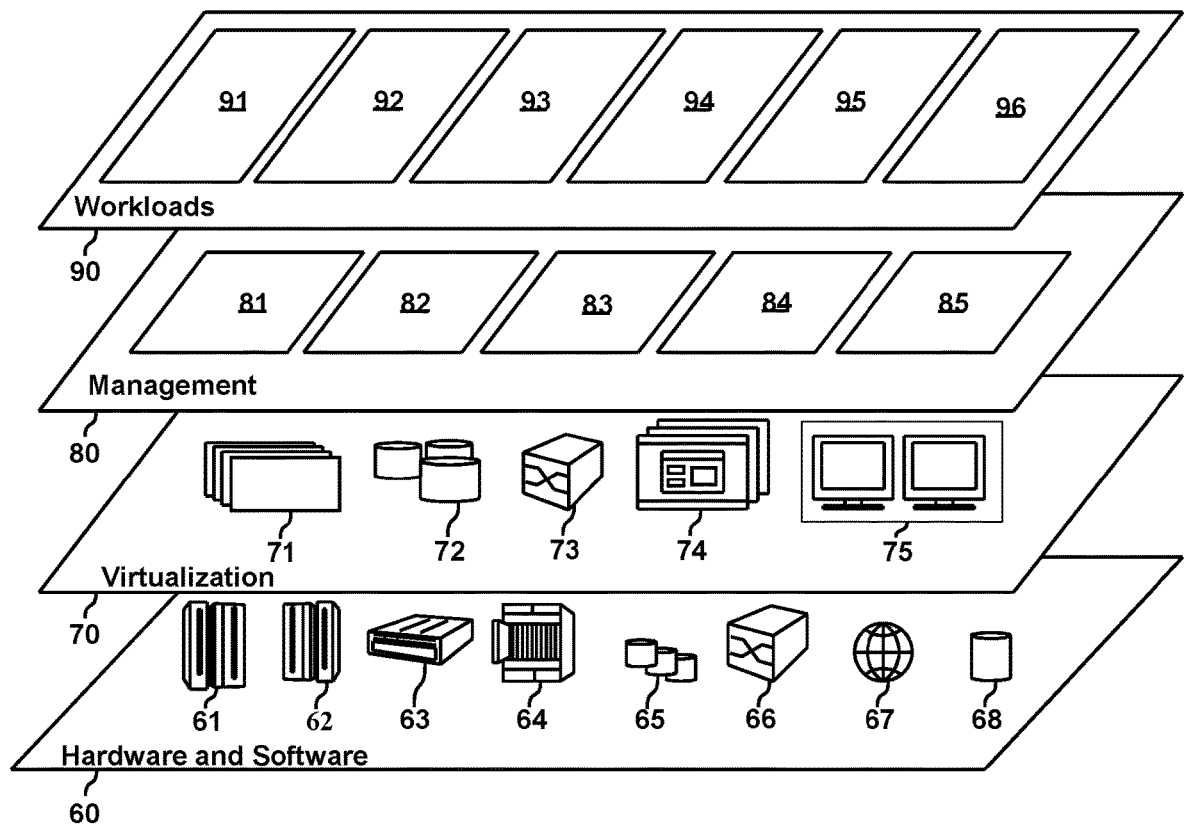
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device provisioning processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method for provisioning an Internet of Things (IoT) device, the method comprising:
    receiving, at a device provisioning system, an event schema for the IoT device, wherein the event schema includes one or more event types collected by the IoT device;
    comparing the one or more event types from the event schema with a plurality of combinations of one or more event types in a device type schema list to identify a match between the one or more event types in the event schema from the IoT device and one of the plurality of combinations of one or more event types in the device type schema list, wherein the device type schema list correlates different combinations of event types to different device types;

in response to identifying a match, assigning the device type to the IoT device based on a correlation in the device type schema list for the device type and the matched combination of one or more event types;

provisioning the IoT device with validated credentials based on the assigned device type; and updating the device type schema list based on the received event schema for the IoT device, wherein the updating the device type schema list includes correlating the received event schema and the assigned device type.

2. The computer-implemented method of claim 1, wherein provisioning the IoT device comprises:

sending the assigned device type to an IoT platform; and receiving, from the IoT platform, the validated credentials for the IoT device.

3. The computer-implemented method of claim 1, wherein receiving the event schema comprises receiving the event schema together with a provisioning request and credentials hardcoded in the IoT device.

4. The computer-implemented method of claim 1, wherein receiving the event schema for the IoT device comprises receiving the event schema from an IoT platform which forwarded the event schema from the IoT device to the device provisioning system.

5. The computer-implemented method of claim 1, further comprising:

in response to not identifying a match, forwarding credentials received from the IoT device to a device manufacturer of the IoT device;

receiving a device type for the IoT device from the device manufacturer; and updating the device type schema based on the event schema for the IoT device and the device type received from the device manufacturer.

6. The computer-implemented method of claim 1, further comprising:

logging receipt of the event schema for the IoT device in a provisioning log;

logging a schema statement for the identified match in the provisioning log; and logging provisioning of the IoT device without logging the validated credentials.

7. The computer-implemented method of claim 1, further comprising validating credentials of the IoT device at the device provisioning system.

8. A device provisioning system comprising:

a network interface coupled to a communication network;

a memory configured to store a device type schema list, wherein the device type schema list correlates each of a plurality of device types with a respective one of a plurality of combinations of one or more event types; and a processor communicatively coupled to the memory and to the network interface, wherein the processor is configured to:

receive, via the network interface, an event schema for an IoT device, wherein the event schema includes one or more event types collected by the IoT device;

compare the one or more event types from the event schema with the plurality of combinations of one or more event types in the device type schema list to identify a match between the one or more event types in the event schema from the IoT device and one of the plurality of combinations of one or more event types in the device type schema list, wherein the device type schema list correlates different combinations of event types to different device types;

in response to identifying a match, assign the device type to the IoT device based on a correlation in the device type schema list for the device type and the matched combination of one or more event types; and update the device type schema list based on the received event schema for the IoT device, wherein the updating the device type schema list includes correlating the received event schema and the assigned device type.

9. The device provisioning system of claim 8, wherein the processor is configured to validate credentials of the IoT device.

10. The device provisioning system of claim 8, wherein the processor is configured to send the assigned device type to an IoT platform for use in validating credentials of the IoT device; and receive, from the IoT platform, validated credentials for the IoT device.

11. The device provisioning system of claim 8, wherein the received event schema is received together with a provisioning request and credentials hardcoded in the IoT device.

12. The device provisioning system of claim 8, wherein the event schema for the IoT device is from an IoT platform which forwarded the event schema from the IoT device to the network interface of the device provisioning system.

13. The device provisioning system of claim 8, wherein the processor is further configured to:

forward credentials received from the IoT device to a device manufacturer of the IoT device in response to not identifying a match;

receive a device type for the IoT device from the device manufacturer; and update the device type schema based on the event schema for the IoT device and the device type received from the device manufacturer.

14. The device provisioning system of claim 8, wherein the processor is further configured to:

log receipt of the event schema for the IoT device in a provisioning log stored in the memory;

log a schema statement for the identified match in the provisioning log; and log provisioning of the IoT device without logging validated credentials.

15. A computer program product comprising a computer readable storage medium having a computer readable program stored therein, wherein the computer readable program, when executed by a processor, causes the processor to:

receive an event schema for an IoT device, wherein the event schema includes one or more event types collected by the IoT device;

compare the one or more event types from the event schema with a plurality of combinations of one or more event types in the device type schema list to identify a match between the one or more event types in the event schema from the IoT device and one of the plurality of combinations of one or more event types in the device type schema list, wherein the device type schema list correlates different combinations of event types to different device types;

in response to identifying a match, assign the device type to the IoT device based on a correlation in the device type schema list for the device type and the matched combination of one or more event types; and update the device type schema list based on the received event schema for the IoT device, wherein the updating the device type schema list includes correlating the received event schema and the assigned device type.

16. The computer program product of claim 15, wherein the computer readable program is further configured to cause the processor to validate credentials of the IoT device.

17. The computer program product of claim 15, wherein the computer readable program is further configured to cause the processor to:

send the assigned device type to an IoT platform for use in validating credentials of the IoT device; and receive, from the IoT platform, validated credentials for the IoT device.

18. The computer program product of claim 15, wherein the received event schema is received together with a provisioning request and credentials hardcoded in the IoT device.

19. The computer program product of claim 15, wherein the computer readable program is further configured to cause the processor to:

forward credentials received from the IoT device to a device manufacturer of the IoT device in response to not identifying a match;

receive a device type for the IoT device from the device manufacturer; and update the device type schema based on the event schema for the IoT device and the device type received from the device manufacturer.

20. The computer program product of claim 15, wherein the computer readable program is further configured to cause the processor to:

log receipt of the event schema for the IoT device in a provisioning log stored in the memory;

log a schema statement for the identified match in the provisioning log; and log provisioning of the IoT device without logging validated credentials.

* * * * *